United States Patent
Hachisuka et al.

(10) Patent No.: US 6,413,425 B1
(45) Date of Patent: *Jul. 2, 2002

(54) REVERSE OSMOSIS COMPOSITE MEMBRANE AND REVERSE OSMOSIS TREATMENT METHOD FOR WATER USING THE SAME

(75) Inventors: Hisao Hachisuka; Kenichi Ikeda, both of Ibaraki (JP)

(73) Assignee: Nitto Denko Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/055,555

(22) Filed: Apr. 6, 1998

(30) Foreign Application Priority Data

Apr. 10, 1997 (JP) ................................ 9-092619

(51) Int. Cl.⁷ .......................... B01D 71/56; B01D 61/02
(52) U.S. Cl. ............. 210/500.38; 210/490; 210/500.34; 210/652; 210/653
(58) Field of Search ............... 210/490, 500.42, 210/500.38, 653, 500.34

(56) References Cited

U.S. PATENT DOCUMENTS

| | | | |
|---|---|---|---|
| 3,133,132 A | | 5/1964 | Loeb et al. |
| 3,133,137 A | | 5/1964 | Loeb et al. |
| 3,620,895 A | * | 11/1971 | Bailey et al. ............... 428/163 |
| 3,878,109 A | * | 4/1975 | Ikeda et al. ............ 210/500.38 |
| 4,277,344 A | | 7/1981 | Cadotte |

(List continued on next page.)

FOREIGN PATENT DOCUMENTS

| | | |
|---|---|---|
| EP | 0 787 525 | 8/1997 |
| JP | Sho 51-13388 | 2/1976 |
| JP | Sho 53-16372 | 2/1978 |
| JP | 58-145740 | 8/1983 |
| JP | 61-287492 A | 12/1986 |
| JP | Sho 62-121603 | 6/1987 |
| JP | Sho 62-197105 | 8/1987 |
| JP | Sho 63-218208 | 9/1988 |
| JP | 02-090990 A | 3/1990 |
| JP | 05-253454 A | 10/1993 |
| JP | 06-170186 A | 6/1994 |
| JP | Hei 7-090152 | 4/1995 |
| JP | 08010595 | * 1/1996 |
| WO | WO92/20438 | 11/1992 |

OTHER PUBLICATIONS

U.S. application No. 09/077,768, Hachisuka et al., filed Jun. 3, 1998.

*Primary Examiner*—Ana Fortuna
(74) *Attorney, Agent, or Firm*—Akin, Gump, Strauss, Hauer & Feld, L.L.P.

(57) ABSTRACT

A reverse osmosis composite membrane comprises a sponge layer, and a separation layer formed on a surface of the sponge layer, wherein at least one substance selected from the group consisting of an electrically neutral organic substance and an electrically neutral polymer is present in the separation layer or a surface of the separation layer is coated with at least one substance selected from the group consisting of an electrically neutral organic substance and an electrically neutral polymer, and wherein the specific surface area of the layer in which the at least one substance is present or the separation layer before the surface coating is in the range of 2 to 1,000. The reverse osmosis composite membrane has a high salt rejection, a high water permeability, and a high fouling tolerance, and permits practical desalination at a relatively low pressure.

4 Claims, 1 Drawing Sheet

U.S. PATENT DOCUMENTS

| | | | |
|---|---|---|---|
| 4,366,062 A | * 12/1982 | Kurihara et al. | 210/651 |
| 4,431,545 A | 2/1984 | Pall et al. | |
| 4,520,044 A | 5/1985 | Sundet | |
| 4,529,646 A | 7/1985 | Sundet | |
| 4,702,840 A | 10/1987 | Degen et al. | |
| 4,778,596 A | 10/1988 | Linder et al. | |
| 4,872,984 A | 10/1989 | Tomaschke | |
| 4,909,943 A | 3/1990 | Fibiger et al. | |
| 4,911,844 A | * 3/1990 | Linder et al. | 210/638 |
| 4,948,507 A | 8/1990 | Tomaschke | |
| 5,019,261 A | 5/1991 | Stengaard | |
| 5,128,041 A | 7/1992 | Degen et al. | |
| 5,156,740 A | 10/1992 | Brüschke | |
| 5,183,571 A | 2/1993 | Hanel et al. | |
| 5,259,950 A | * 11/1993 | Shiro et al. | 210/490 |
| 5,358,745 A | 10/1994 | Tran et al. | |
| 5,674,398 A | * 10/1997 | Hirose et al. | 210/500.38 |
| 5,989,426 A | * 11/1999 | Hirose et al. | 210/500.38 |
| 6,177,011 B1 | * 1/2001 | Hachisuka et al. | 210/500.38 |

* cited by examiner

REVERSE OSMOSIS COMPOSITE MEMBRANE AND REVERSE OSMOSIS TREATMENT METHOD FOR WATER USING THE SAME

FIELD OF THE INVENTION

The present invention relates to improvement in the performance of a reverse osmosis composite membrane such as performance stability and fouling tolerance for selectively separating the components of a liquid mixture. More particularly, the present invention relates to a reverse osmosis composite membrane having a high salt rejection, a high chlorine tolerance, and a high fouling tolerance, which comprises a polymer thin film on the reverse osmosis composite membrane, and to a reverse osmosis treatment method for water using the same.

Such a reverse osmosis composite membrane is suitable for manufacturing ultrapure water, desalinating brackish water, and the like, and it also can contribute to the removal and recovery of the contaminating sources or effective substances from a soil or the like, the cause of pollution in a dyeing waste water system or an electrochemical deposition paint waste water system to implement a waste water recycling system. In particular, it can operate stably for a long period with respect to the quality of water containing various membrane-fouling substances, such as surfactants and transition metal components including iron, which cause a decrease in flux.

BACKGROUND OF THE INVENTION

Examples of the industrially utilized reverse osmosis membranes include Loeb type membranes described in U.S. Pat. Nos. 3,133,132 and 3,133,137 as asymmetric membranes made of cellulose acetate. On the other hand, reverse osmosis composite membranes, in which an active thin film substantially having a selective separation property is formed on a microporous support membrane, are known as reverse osmosis membranes having a different structure from the asymmetric reverse osmosis membranes.

Presently, a number of such reverse osmosis composite membranes, in which a thin film of polyamide obtained by interfacial polymerization of polyfunctional aromatic amine and polyfunctional aromatic acid halide is formed on a support membrane, are known (for example, Publication of Japanese Patent Application (Tokkai Sho) No. 55-147106, Publication of Japanese Patent Application (Tokkai Sho) No. 62-121603, Publication of Japanese Patent Application (Tokkai Sho) No. 63-218208, and Publication of Japanese Patent Application (Tokkai Hei) No. 2-187135). Also, those having a thin film of polyamide obtained by interfacial polymerization of polyfunctional aromatic amine and polyfunctional alicyclic acid halide formed on a support membrane are known (for example, Publication of Japanese Patent Application (Tokkai Sho) No. 61-42308).

In addition, various methods for after treatment of the reverse osmosis membrane are disclosed. For example, methods using various polymers as a protective layer are disclosed (for example, Publication of Japanese Patent Application (Tokkai Sho) No. 51-13388, Publication of Japanese Patent Application (Tokkai Sho) No. 53-16372, Publication of Japanese Patent Application (Tokkai Sho) No. 62-197105, and Publication of Japanese Patent Application (Tokko Hei) No. 7-90152) Recently, it has been expected to apply a reverse osmosis membrane to a treatment for water containing fouling substances such as various surfactants, for example, sewage. In addition to the high performance of the reverse osmosis membrane (a high salt rejection and a high water permeability), a high fouling resistance is required to maintain the desired flux for a long period. The above reverse osmosis membranes and the conventional after treatment methods are not sufficient to satisfy these two requirements. Therefore, a reverse osmosis composite membrane having a higher performance has been sought.

One fouling mechanism includes the charge condition of the membrane. For example, the surface of a cross-linked polyamide reverse osmosis membrane obtained by interfacial polymerization of polyfunctional aromatic amine and polyfunctional alicyclic acid halide has a negative charge due to the residual carboxylic acid. The membrane surface having negative charge adsorbs, for example, cationic fouling substances, decreasing the flux. Therefore, a membrane has been required that is neutral in charge and has a high water permeability and a high salt rejection.

SUMMARY OF THE INVENTION

It is an object of the present invention to provide a reverse osmosis composite membrane that has a high salt rejection, a high water permeability, and a high fouling tolerance and permits practical desalination at a low pressure, and a reverse osmosis treatment method for water using the same.

In order to achieve the above object, the present invention provides a reverse osmosis composite membrane comprising a sponge layer, and a separation layer (also referred to as a skin layer) formed on a surface of the sponge layer, wherein at least one substance selected from the group consisting of an electrically neutral organic substance and an electrically neutral polymer is present in the separation layer or a surface of the separation layer is coated with at least one substance selected from the group consisting of an electrically neutral organic substance and an electrically neutral polymer, and wherein a specific surface area of the layer in which the at least one substance is present or the separation layer before the surface coating is in the range of 2 to 1,000. The specific surface area is defined by the following expression: the specific surface area of the separation layer=(the surface area of the separation layer)/(the surface area of the support).

The surface area of the separation layer represents the area of the surface to be in contact with a feed liquid. The surface area of the support indicates the surface area of a support membrane such as polysulfone, with which the sponge layer under the separation layer is in contact. The specific surface area of the separation layer is 2 or more when the surface of the support membrane is relatively flat and the surface of the separation layer is rough and has wrinkles. The surface area and the specific surface area are measured by a general measurement device, for example, a surface area measurement device, a specific surface area measurement device, a scanning electron microscope, a transmission electron microscope, or an atomic force microscope.

In the reverse osmosis composite membrane, it is preferable that the specific surface area of the layer in which the at least one substance is present or the separation layer before the surface coating is in the range of 3 to 500. When the specific surface area is 3 or more, the water permeability is improved. If the specific surface area is more than 500, the strength of the separation layer decreases.

In the reverse osmosis composite membrane, the specific surface area of the separation layer after the surface coating is preferably reduced to 90% or less of the specific surface area of the separation layer before the surface coating, and more preferably, 60% or less. If the specific surface area of the separation layer after the surface coating is more than 90% of that of the separation layer before the surface coating, the surface is not sufficiently covered, preventing a stable fouling tolerance for a long period.

In the reverse osmosis composite membrane, it is preferable that the at least one substance selected from the group consisting of an electrically neutral organic substance and an electrically neutral polymer is an organic substance or a polymer that has a nonionic hydrophilic group. Electrical neutrality is preferred for controlling the electrical adsorption by the membrane of membrane-fouling substances having a charge group present in water. If the organic substance or the polymer has a nonionic hydrophilic group (for example, a —OH group) in addition to the electrical neutrality, adsorption due to a hydrophobic interaction on the membrane is controlled when the membrane-fouling substances have a hydrophobic group.

In the reverse osmosis composite membrane, it is preferable that the organic substance or the polymer that has a nonionic hydrophilic group is polyvinyl alcohol that is water-insoluble at 25° C. and is water-soluble at 80° C. Such polyvinyl alcohol controls the adsorption of the membrane-fouling substances. On the other hand, polyvinyl alcohol that is water-insoluble at more than 80° C. has a small number of alcohol groups, so that such polyvinyl alcohol does not tend to control the adsorption of the membrane-fouling substances.

In the reverse osmosis composite membrane, it is preferable that the polyvinyl alcohol has a saponification degree of 95% or more, because a sufficient number of alcohol groups can be obtained.

In the reverse osmosis composite membrane, it is preferable that the at least one substance selected from the group consisting of an electrically neutral organic substance and an electrically neutral polymer coating the surface of the separation layer is an organic substance or a polymer that has a nonionic hydrophilic group, and has a thickness in the range of 0.001 to 1 $\mu$m. If the thickness is more than 1 $\mu$m, the water permeability obtained after the coating decreases significantly. If the thickness is less than 0.001 $\mu$m, a uniform coating will be difficult.

In the reverse osmosis composite membrane, it is preferable that the reverse osmosis composite membrane has a flux of 0.6 [$m^3/m^2$/day] or more in a reverse osmosis test conducted by feeding a 500 ppm NaCl solution at a pressure of 7.5 kgf/$cm^2$ and a temperature of 25° C. to ensure a sufficient flux after the coating.

In the reverse osmosis composite membrane, it is preferable that the reverse osmosis composite membrane has a flux of 0.6 [$m^3/m^2$/day] or more in a reverse osmosis test conducted by feeding a 1500 ppm NaCl solution at a pressure of 15 kgf/$cm^2$ and a temperature of 25° C. to ensure a sufficient flux at a practical level.

In the reverse osmosis composite membrane, it is preferable that the reverse osmosis composite membrane is formed of aromatic polyamide. Here, the aromatic polyamide refers to polyamide in which at least one component selected from the group consisting of an acid component and an amine component is aromatic. The preferred aromatic polyamide is a completely aromatic polyamide comprising an aromatic acid component and an aromatic amine component. Such aromatic polyamide can maintain a high water permeability and a high salt rejection.

The present invention provides a reverse osmosis treatment method for water comprising contacting raw water with a reverse osmosis composite membrane comprising a sponge layer and a separation layer formed on a surface of the sponge layer, wherein at least one substance selected from the group consisting of an electrically neutral organic substance and an electrically neutral polymer is present in the separation layer or a surface of the separation layer is coated with at least one substance selected from the group consisting of an electrically neutral organic substance and an electrically neutral polymer, and wherein a specific surface area of the layer in which the at least one substance is present or the separation layer before the surface coating is in the range of 2 to 1,000.

In the method, the reverse osmosis composite membrane is useful even for treating water containing a surfactant. In the conventional reverse osmosis composite membranes, the membrane adsorbs a surfactant, so that a stable performance cannot be obtained. In the reverse osmosis composite membrane of the present invention, the adsorption of the surfactant by the membrane is controlled. Therefore, a stable reverse osmosis treatment can be conducted for water containing a surfactant without decreasing the separation performance.

In the method, it is preferable that the content of the surfactant is in the range of 0.01 ppm to 20 wt. %. In the method of the present invention, the content of the surfactant can be in any range. If the content is in the range of 0.01 ppm to 20 wt. %, a sufficient surface potential property of the present invention can be provided.

In the method, the reverse osmosis composite membrane is useful even for treating water containing a transition metal component. In the conventional reverse osmosis composite membranes, the membrane adsorbs a transition metal component, so that a stable performance cannot be obtained. In the reverse osmosis composite membrane of the present invention, the adsorption of the transition metal component by the membrane is controlled. Therefore, a stable reverse osmosis treatment can be conducted for water containing a transition metal component without decreasing the separation performance.

In the method, it is preferable that the transition metal component is iron, because the reverse osmosis composite membrane of the present invention can control the adsorption of the iron component sufficiently.

In the method, it is preferable that the content of the transition metal component is in the range of 0.01 ppm to 20 wt. %. In the method of the present invention, the content of the transition metal component can be in any range. If the content of the transition metal component is in the range of 0.01 ppm to 20 wt. %, a sufficient surface potential property of the present invention can be provided.

In the method, the flux does not decrease even when treating raw water containing a fouling substance (including a surfactant) having 20 to 30 ppm of TOC (total organic carbon). Therefore, a practical water treatment can be performed. On the other hand, the flux decreases when treating such raw water in the conventional technology. Therefore, a practical water treatment cannot be performed.

According to the reverse osmosis composite membrane and the reverse osmosis treatment method using the same of the present invention as described above, a high salt rejection, a high water permeability, and a high fouling tolerance is provided, and a practical desalination can be conducted at a low pressure.

PREFERRED EMBODIMENTS OF THE PRESENT INVENTION

Figure 1:
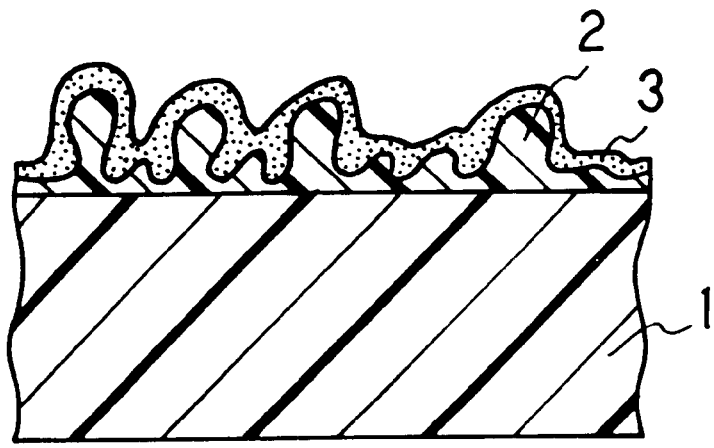
FIG. 1 shows a schematic cross-sectional view of the surface portion of a reverse osmosis composite membrane in one embodiment of the present invention.

The method for controlling the surface $\zeta$ potential of the present invention is not particularly limited. The surface of the reverse osmosis composite membrane is preferably treated with at least one substance selected from the group consisting of an electrically neutral organic substance and an electrically neutral polymer, and more preferably, at least one substance selected from the group consisting of an organic substance and a polymer that has a nonionic hydrophilic group. Such at least one substance selected from the group consisting of an electrically neutral organic substance and an electrically neutral polymer is an organic substance or a polymer that has a cationic group and an anionic group, which is prepared as a copolymer or a blend. When the substance that has a cationic group and an anionic group is a molecule, the molecule has a cationic group and an anionic group. The cationic group and the anionic group electrically cancel with each other, making the molecule neutral. For a blend or a composition that has a plurality of molecules, as a result of mixing, the total number of cationic groups is substantially equal to that of anionic groups. The cationic groups and the anionic groups electrically cancel with each other, making the blend or the composition neutral. Therefore, for the blend or the composition, the entire system should be neutral. Examples of a suitable nonionic hydrophilic group are expressed by the following Formulae (1) to (4):

  (1)

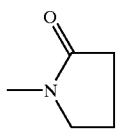  (2)

—CONH$_2$—  (3)

—CH$_2$CH$_2$OR—  (4)

wherein R represents an alkyl group having 1 to 4 carbon atoms.

The organic substance that has a nonionic hydrophilic group includes oligomers such as triethylene glycol and diethylene glycol. The polymer that has a nonionic hydrophilic group is selected from the group consisting of polyvinyl alcohol, a saponified polyethylene-vinyl acetate copolymer, polyvinyl pyrrolidone, hydroxypropyl cellulose, vinyl polymers having a nonionic hydrophilic group such as polyethylene glycol, condensation polymerized compounds having a nonionic hydrophilic group, and addition polymerized compounds having a nonionic hydrophilic group. A more preferable polymer having a nonionic hydrophilic group is water-insoluble at 25° C. and is hot-water-soluble, for example, polyvinyl alcohol.

The saponification degree of polyvinyl alcohol is 95% or more, and more preferably, in the range of 99 to 100%. In this case, the polyvinyl alcohol is water-insoluble at 25° C. due to hydrogen bonding between molecular chains but is water-soluble at 80° C. Satisfying these conditions is preferable because of the following reasons. Since many —OH groups are in contact with treated water on the surface of the membrane, the hydrophilicity increases. Thus, the tolerance to fouling substances increases and the decrease of the flux involved in the surface treatment is controlled. Therefore, the membrane can provide a very good performance.

A specific controlling method for the surface treatment of the reverse osmosis composite membrane using the organic substance or the polymer will be described below.

The reverse osmosis composite membrane is not particularly limited. The examples of the reverse osmosis composite membranes are polyamide, polyurea and the like, manufactured by an interfacial polymerization method. These membranes can be readily obtained by conventionally known methods. For example, at least one surface of a porous polysulfone support membrane is coated with an aqueous solution of a monomer or a polymer that has a reactive amino group such as metaphenylenediamine, piperazine, or polyethyleneimine, and the coated surface is brought into contact with a solution in which a polyfunctional acid chloride such as trimesic acid chloride or isophthalic acid chloride, a polyfunctional isocyanate such as tolylenediisocyanate, or a mixture thereof is dissolved in a solvent such as hexane, to perform interfacial polymerization on the porous polysulfone support membrane to form a thin film having desalination properties. As a result, a reverse osmosis composite membrane can be made.

The specific surface area of the separation layer of these reverse osmosis composite membranes is preferably 2 to 1,000, and more preferably, 3 to 500 to obtain a high water permeability. If the specific surface area is less than 2, a sufficient flux cannot be obtained after surface coating described below. If the specific surface area is more than 1,000, a uniform surface coating cannot be conducted. If the specific surface area is 3 to 500, the flux of the reverse osmosis composite membrane is 0.6 [m$^3$/m$^2$/day] or more after an aqueous solution having pH 6.5 containing 500 ppm of sodium chloride permeates the membrane for 1 hour at an operation pressure of 7.5 kgf/cm$^2$ and a temperature of 25° C. Therefore, a reverse osmosis composite membrane can be obtained that does not practically cause problems even if the permeability is decreased by the surface coating.

Such a reverse osmosis composite membrane is coated with a solution of the organic substance or the polymer and dried to obtain a final reverse osmosis composite membrane in which surface charge is controlled. This organic substance or polymer that has a nonionic hydrophilic group is dissolved in a solvent that is not likely to damage the active thin film layer of the reverse osmosis composite membrane, such as water, lower alcohol, hydrocarbon halide, aliphatic hydrocarbon, acetone, acetonitrile, or a mixture thereof Among these solvents, aliphatic alcohols such as methanol, ethanol, propanol, and butanol; aliphatic alcohol halide such as ethylene chlorohydrin; methoxymethanol; methoxyethanol; and a mixed solvent of at least one of these lower alocohols and water are preferable. In the mixed solvent, the ratio of the lower alcohol to water is not particularly limited. The ratio of water is preferably 0 to 90%. When water is used as a solvent, a surfactant is preferably added to improve the wettability for the membrane.

The concentration of the organic substance or the polymer prepared by using the solvent is preferably in the range of 0.01 to 20 wt. %, and more preferably, 0.05 to 5 wt. %. The coating method is not particularly limited. A dipping method, a transfer method, a spraying method, or the like is preferably used. The drying means and the drying temperature after the coating are not particularly limited. The drying temperature is preferably in the range of 20 to 200° C., and more preferably, 50 to 150° C.

The thickness of the thus obtained thin film on the reverse osmosis composite membrane is preferably in the range of 0.001 to 1 μm, and more preferably, 0.005 to 0.5 μm to control the decrease of the flux caused by the coating. The method for controlling the thickness is not particularly limited. The thickness can be controlled by the concentration of the solution, or the like.

As a method for controlling the surface of the reverse osmosis composite membrane, the surface charge can be controlled by mixing the organic substance or the polymer with an aqueous solution of the monomer or the polymer each having a reactive amino group or a solution in which acid chloride or isocyanate is dissolved in a solvent such as hexane, and manufacturing a reverse osmosis composite membrane according to the above procedure.

In this case, the lower alcohol is preferably added to at least one of the solutions, to which the polymer is added, to provide the solubility of the polymer.

The performance of the reverse osmosis composite membrane is not particularly limited. The flux is preferably 0.6 $[m^3/m^2/day]$ or more in a reverse osmosis test conducted by feeding a 500 ppm NaCl solution at a pressure of 7.5 $kgf/cm^2$ and a temperature of 25° C. to maintain a high water permeability of the reverse osmosis composite membrane after the treatment with the organic substance or the polymer. The water permeability of the reverse osmosis composite membrane obtained after the treatment with the organic substance or the polymer is not particularly limited. In view of its practical use, the flux is preferably 0.6 $[m^3/m^2/day]$ or more in a reverse osmosis test conducted by feeding a 1,500 ppm NaCl solution at a pressure of 15 $kgf/cm^2$ and a temperature of 25° C.

Furthermore, the flux of the reverse osmosis composite membrane having a water-insoluble polymer having a non-ionic hydrophilic group as a surface layer or in the separation layer is preferably 0.1 $[m^3/m^2/day]$ or more, and more preferably, 0.6 $[m^3/m^2/day]$ or more in view of practical operation when evaluated by feeding a 1,500 ppm NaCl solution at a pressure of 15 $kgf/cm^2$ and a temperature of 25° C.

Figure 2:
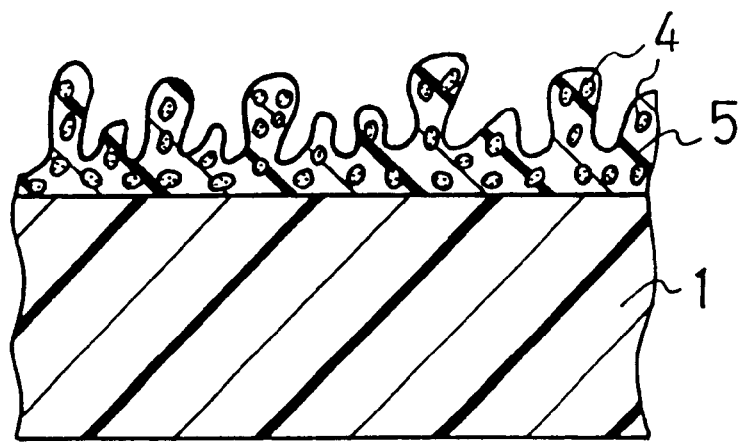
FIG. 2 shows a schematic cross-sectional view of the surface portion of a reverse osmosis composite membrane in another embodiment of the present invention.

Next, the embodiments of the present invention will be described below with reference to the drawings. FIGS. 1–2 are schematic cross-sectional views of the embodiments of the present invention. In FIG. 1, a separation layer (skin layer) 2 is present on a porous layer 1. A thin film 3 of polyvinyl alcohol is present as the surface layer of the separation layer 2. FIG. 2 shows a layer (portion) in which a polyvinyl alcohol component 4 and a separation layer (skin layer) 5 are present in a phase separation condition on the porous layer 1. The polyvinyl alcohol component need not be in the shape of a thin film. In the present invention, the conditions of FIGS. 1 and 2 may be combined.

The present invention will be described below with reference to the examples. However, the present invention is not limited to these examples.

EXAMPLE 1

3.0 wt. % of triethylamine, 6.0 wt. % of camphor sulfonic acid, and 5.0 wt. % of isopropyl alcohol were added to an aqueous solution containing 3.0 wt. % of m-phenylenediamine and 0.15 wt. % of sodium lauryl sulfate. A microporous polysulfone support membrane was coated and contacted with the solution for several seconds. Then, the excess solution was removed to form a layer of the solution on the support membrane.

Next, the surface of such a support membrane was coated and contacted with an IP1016 (isoparaffin hydrocarbon oil manufactured by Idemitsu Petrochemical Corporation) solution containing 0.20 wt. % of trimesic acid chloride and 0.05 wt. % of isopropyl alcohol and was then maintained in a hot air dryer at 120° C. for 3 minutes. Consequently, a skin layer was formed on the support. Thus, a reverse osmosis composite membrane was obtained. The reverse osmosis composite membrane was sufficiently washed, and then the performance of the membrane was evaluated. The cross-section of the membrane was observed with a transmission electron microscope after drying. The specific surface area of the skin layer was measured. The performance of the membrane is shown in Table 1. The specific surface area of the skin layer was 4.3.

The surface of a reverse osmosis composite membrane obtained in the same manner was coated with a solution containing 0.25 wt. % of polyvinyl alcohol (average polymerization degree n=2,600) having a saponification degree of 99.5% (isopropyl alcohol/water=3/7), and dried at 100° C. for 5 minutes. The surface was coated with the same solution again, and dried at 130° C. for 5 minutes. As a result, a uniform polyvinyl alcohol (PVA) coating film having an average thickness of about 0.1 μm was formed. Thus, the reverse osmosis composite membrane of the present invention was obtained. The specific surface area of the skin layer was 2.0, which was reduced to 47% of the specific surface area measured before the PVA coating. The portion of the surface layer of the reverse osmosis composite membrane had the cross-sectional structure as shown in FIG. 1.

The performance of the reverse osmosis composite membrane having the PVA coating film was evaluated by using an aqueous solution containing 1,500 ppm of sodium chloride at a pressure of 15 $kgf/cm^2$ and is shown in Table 1.

TABLE 1

| Sample | NaCl (1500 ppm) rejection [%] | Flux pressure: 15 $kgf/cm^2$ [$m^3/m^2/day$] | Ratio of flux after treatment to flux before treatment |
|---|---|---|---|
| Example 1 | 99.74 | 1.1 | 0.65 |
| Before polyvinyl alcohol coating | 99.48 | 1.7 | — |
| Evaluation with a 500 ppm NaCl solution at a pressure of 7.5 $kgf/cm^2$ | 99.56 | 0.8 | |

The specific surface area of the skin layer was 2.0 (47% of the specific surface area measured before the treatment).

The reverse osmosis composite membrane was set in a flat membrane cell and evaluated for fouling tolerance by using industrial water. The flux (evaluated at a pressure of 15 $kgf/cm^2$) was evaluated after 5 minutes and 28 hours in a continuous operation test in which the industrial water permeates the membrane at a pressure of 15 $kgf/cm^2$. The results are shown in Table 2.

COMPARATIVE EXAMPLE 1

The same measurement as in Example 1 was made for the reverse osmosis composite membrane before its surface was coated with polyvinyl alcohol. The results are shown in Table 2.

TABLE 2

| Sample | Flux-1[*1)] [m³/m²/day] | Flux-2[*2)] [m³/m²/day] | Retention [%] |
|---|---|---|---|
| Example 1 | 1.2 | 1.0 | 83 |
| Comparative Example 1 | 1.6 | 0.9 | 56 |

[*1)]Flux-1: the flux evaluated after 5 minutes of permeation of industrial water
[*2)]Flux-2: the flux evaluated after 28 hours of permeation of the industrial water
Retention: (Flux-2/Flux-1) × 100

As is apparent from Example 1 and Comparative Example 1, the article of this example had a high flux retention by forming the PVA thin layer having a saponification degree of 99.5%, and the flux stability was improved.

EXAMPLE 2

A reverse osmosis composite membrane was manufactured by interfacial polycondensation in the same manner as in Example 1. The surface of the skin layer was coated with polyvinyl alcohol (PVA) having a saponification degree of 99.5% to an average thickness of about 0.1 μm by the same method.

The thus obtained reverse osmosis composite membrane was set in a flat membrane cell and evaluated for fouling tolerance by using industrial water (an aqueous solution containing 1.0 ppm of an iron component). The industrial water was filtered with a 5 μm MF (microfiltration) filter. The flux (evaluated at a pressure of 15 kgf/cm²) was evaluated after 5 minutes and 28 hours in a pressure circulation test in which the filtered water permeates the membrane at a pressure of 15 kgf/cm². The results are shown in Table 3.

COMPARATIVE EXAMPLE 2

The same measurement as in Example 2 was made for the reverse osmosis composite membrane before its surface was coated with polyvinyl alcohol. The results are shown in Table 3.

TABLE 3

| Sample | Flux-1[*1)] [m³/m²/day] | Flux-2[*2)] [m³/m²/day] | Retention [%] |
|---|---|---|---|
| Example 2 | 1.0 | 0.9 | 90 |
| Comparative Example 2 | 1.0 | 0.6 | 60 |

[*1)]Flux-1: the flux evaluated after 5 minutes from the start of pressure circulation
[*2)]Flux-2: the flux evaluated after 28 hours from the start of pressure circulation
Retention: (Flux-2/Flux-1) × 100

As is apparent from Example 2 and Comparative Example 2, the article of this example had a high flux retention by forming the PVA thin layer having a saponification degree of 99.5%, and the flux stability was improved. After the evaluation, the membrane was washed with water, and the surface of the membrane was analyzed. As a result, the surface of the membrane in Comparative Example 2 adsorbed the iron component, while no or only a minor amount of the iron component was detected on the surface of the membrane in Example 2. The iron component did not permeate or adhere to the reverse osmosis composite membrane of Example 2 but flowed to the concentrated water side.

EXAMPLE 3

A reverse osmosis composite membrane was manufactured by interfacial polycondensation in the same manner as in Example 1. Coating was conducted with polyvinyl alcohol (PVA) having a saponification degree of 99.5% in the same manner.

The thus obtained reverse osmosis composite membrane was set in a flat membrane cell. For the evaluation of fouling tolerance, the flux decrease was measured by using sewage containing a surfactant. The sewage containing a surfactant was filtered with a 5 μm MF (microfiltration) filter. The flux (evaluated at a pressure of 15 kgf/cm²) was evaluated at the start time and after 14 days in a pressure circulation test in which the filtered water permeates the membrane at a pressure of 15 kgf/cm². The results are shown in Table 4.

COMPARATIVE EXAMPLE 3

The measurement described in Example 3 was made for the membrane before the PVA layer was formed, that is, the membrane without coating. The results are shown in Table 4.

TABLE 4

| Sample | Flux-1[*1)] [m³/m²/day] | Flux-2[*2)] [m³/m²/day] | Retention [%] |
|---|---|---|---|
| Example 3 | 1.2 | 1.1 | 92 |
| Comparative Example 3 | 1.2 | 0.6 | 50 |

[*1)]Flux-1: the flux evaluated after the start of pressure circulation
[*2)]Flux-2: the flux evaluated after 14 days of pressure circulation
Retention: (Flux-2/Flux-1) × 100

As described above, according to this example, the flux stability was improved by forming the PVA thin layer. Also, a reverse osmosis composite membrane was made that had a high salt rejection and a high water permeability and permitted practical desalination at a relatively low pressure.

EXAMPLE 4

3.0 wt. % of triethylamine, 6.0 wt. % of camphor sulfonic acid, and 5.0 wt. % of isopropyl alcohol were added to an aqueous solution containing 3.0 wt. % of m-phenylenediamine and 0.15 wt. % of sodium lauryl sulfate. 0.5 wt % of polyvinyl alcohol (PVA) having a saponification degree of 99% was added to the aqueous solution composition. The PVA was dissolved in water at 80° C. and added. A microporous polysulfone support membrane was coated with this solution composition and was in contact with the solution composition for several seconds. Then, the excess solution was removed to form a layer of the aqueous solution composition on the support membrane.

Next, the surface of such a support membrane was coated and contacted with an IP1016 (isoparaffin hydrocarbon oil manufactured by Idemitsu Petrochemical Corporation) solution containing 0.20 wt. % of trimesic acid chloride and 0.05 wt. % of isopropyl alcohol and was then maintained in a hot air dryer at 120° C. for 3 minutes. Consequently, a skin layer was formed on the support. Thus, a reverse osmosis composite membrane was obtained. The reverse osmosis composite membrane was sufficiently washed, and the performance of the membrane was evaluated. The cross-section of the reverse osmosis composite membrane was observed with a transmission electron microscope after drying. The specific surface area of the skin layer was measured. The performance of the membrane is shown in Table 5. The specific surface area of the skin layer was 3.5. The portion of the surface layer of the reverse osmosis composite membrane had the cross-sectional structure as shown in FIG. 2.

TABLE 5

| Sample | NaCl (1500 ppm) rejection [%] | Flux (pressure: 15 kgf/cm$^2$) [m$^3$/m$^2$/day] |
|---|---|---|
| Example 4 | 99.20 | 1.1 |

The obtained flat membrane was evaluated by using industrial water in the same manner as in Example 1. The results are shown in Table 6.

TABLE 6

| Sample | Flux-1 [m$^3$/m$^2$/day] | Flux-2 [m$^3$/m$^2$/day] | Retention [%] |
|---|---|---|---|
| Example 4 | 1.1 | 0.9 | 82 |
| Comparative Example 1 | 1.6 | 0.9 | 56 |

As described above, the reverse osmosis composite membrane of the present invention had a high salt rejection, a high water permeability, and a high fouling tolerance, and permitted practical desalination at a relatively low pressure. Furthermore, the performance of the reverse osmosis composite membrane did not deteriorate significantly even by conducting a reverse osmosis treatment with raw water containing a surfactant or a transition metal component.

The invention may be embodied in other forms without departing from the spirit or essential characteristics thereof. The embodiments disclosed in this application are to be considered in all respects as illustrative and not limitative, the scope of the invention is indicated by the appended claims rather than by the foregoing description, and all changes which come within the meaning and range of equivalency of the claims are intended to be embraced therein.

What is claimed is:

1. A reverse osmosis composite membrane comprising:

a sponge layer; and a separation layer formed on a surface of the sponge layer,
wherein said separation layer is formed of an aromatic polyamide, wherein a surface of the separation layer is coated with at least one electrically neutral organic substance having a nonionic hydrophilic group, wherein the at least one electrically neutral organic substance comprises polyvinyl alcohol that is water-insoluble at 25° C., is water-soluble at 80° C., and has a degree of saponification in a range of 99% to 100%, wherein a specific surface area of the separation layer before the surface coating is in the range of 2 to 1,000; and wherein the reverse osmosis composite membrane has a flux of 0.6 m$^3$/m$^2$/day or more in a reverse osmosis test conducted by feeding a 1500 ppm NaCl solution at a pressure of 15 kgf/cm2 and a temperature of 25° C.

2. The reverse osmosis composite membrane according to claim 1, wherein the specific surface area of the layer in which the at least one substance is present or the separation layer before the surface coating is in the range of 3 to 500.

3. The reverse osmosis composite membrane according to claim 1, wherein the at least one electrically neutral organic substance coating the surface of the separation layer has a thickness in the range of 0.001 to 1 μm.

4. The reverse osmosis composite membrane according to claim 1, having a flux of 0.6 [m$^3$/m$^2$/day] or more in a reverse osmosis test conducted by feeding a 500 ppm NaCl solution at a pressure of 7.5 kgf/cm$^2$ and a temperature of 25° C.

* * * * *